(12) United States Patent
Lee et al.

(10) Patent No.: US 12,508,619 B2
(45) Date of Patent: Dec. 30, 2025

(54) CATHODE MATERIAL INTEGRATED PROCESSING DEVICE

(71) Applicants: DAE SUNG MACHINERY CO., LTD., Siheung-si (KR); ECOPRO BM CO., LTD., Cheongju-si (KR)

(72) Inventors: Sung Min Lee, Suwon-si (KR); Hee Sung Lee, Ansan-si (KR); Chul U Bak, Siheung-si (KR)

(73) Assignees: DAE SUNG MACHINERY CO., LTD., Siheung-si (KR); ECOPRO BM CO., LTD., Cheongju-si (KR)

( * ) Notice: Subject to any disclaimer, the term of this patent is extended or adjusted under 35 U.S.C. 154(b) by 435 days.

(21) Appl. No.: 18/086,801

(22) Filed: Dec. 22, 2022

(65) Prior Publication Data
US 2023/0278061 A1    Sep. 7, 2023

(30) Foreign Application Priority Data
Mar. 4, 2022 (KR) .......................... 10-2022-0027858

(51) Int. Cl.
*B05B 13/02* (2006.01)
*B05B 9/00* (2006.01)
(Continued)

(52) U.S. Cl.
CPC .............. *B05B 15/25* (2018.02); *B05B 9/002* (2013.01); *B05B 13/025* (2013.01); *F26B 3/20* (2013.01);
(Continued)

(58) Field of Classification Search
None
See application file for complete search history.

(56) References Cited

U.S. PATENT DOCUMENTS 2,256,281 A * 9/1941 Finley .................. E01C 19/105
366/24
4,556,175 A   12/1985 Motoyama et al.
(Continued)

FOREIGN PATENT DOCUMENTS

CN         109140956       1/2019
CN         208348696       1/2019
(Continued)

OTHER PUBLICATIONS

EPO, Search Report of EP 22213927.1 dated Aug. 9, 2023.
SIPO, Office Action of CN 2022116627900 dated Sep. 5, 2025, total 13 pages.

*Primary Examiner* — Binu Thomas
(74) *Attorney, Agent, or Firm* — LEX IP MEISTER, PLLC

(57) ABSTRACT

A cathode material integrated processing device, which dries, applies, and heat-treats a cathode material, according to an embodiment of the invention includes a support frame, a chamber part including a cylindrical body configured to accommodate the cathode material and a thick plate coupled to each of both ends of the cylindrical body to seal both the ends of the cylindrical body and configured to fix the cylindrical body to an upper portion of the support frame, a heating part disposed in each of the outside the cylindrical body and the outside the thick plate of the chamber part to heat the chamber part, a spray part including one or more nozzles, which is disposed between an upper portion and one side of the cylindrical body of the chamber part and is inserted in a longitudinal direction of the cylindrical body to spray a coating liquid to the cathode material within the chamber part through a gas, a stirring part rotatably disposed inside the cylindrical body of the chamber part to stir the cathode material within the chamber part, a driving part connected to one side of the stirring part and rotatably (Continued)

disposed at one side of an upper portion of the support frame to rotate the stirring part, and a control part configured to control the heating part, the spray part, and the driving part.

11 Claims, 6 Drawing Sheets

(51) Int. Cl.
    *B05B 15/25*     (2018.01)
    *F26B 3/20*     (2006.01)
    *F26B 3/24*     (2006.01)
    *F26B 9/08*     (2006.01)
    *F26B 11/04*     (2006.01)
    *F26B 25/04*     (2006.01)
    *F26B 25/06*     (2006.01)
    *F26B 25/12*     (2006.01)
    *F26B 25/16*     (2006.01)
    *H01M 4/04*     (2006.01)
    *H01M 4/139*     (2010.01)

(52) U.S. Cl.
    CPC ............... *F26B 3/24* (2013.01); *F26B 9/082* (2013.01); *F26B 11/0445* (2013.01); *F26B 25/04* (2013.01); *F26B 25/06* (2013.01); *F26B 25/12* (2013.01); *F26B 25/16* (2013.01); *H01M 4/0419* (2013.01); *H01M 4/0471* (2013.01); *H01M 4/139* (2013.01)

(56) References Cited

U.S. PATENT DOCUMENTS

| | | | | |
|---|---|---|---|---|
| 5,038,709 | A | * | 8/1991 | Yamada .................. B01J 2/003 118/666 |
| 2008/0193632 | A1 | * | 8/2008 | O'Hara .................. B01J 2/006 118/712 |
| 2023/0013608 | A1 | * | 1/2023 | Hellenes ................ F26B 11/16 |
| 2023/0278052 | A1 | * | 9/2023 | Lee ....................... B05B 13/025 118/64 |
| 2023/0278060 | A1 | * | 9/2023 | Lee ....................... B05B 13/025 118/708 |

FOREIGN PATENT DOCUMENTS

| | | | |
|---|---|---|---|
| CN | 110108093 | | 8/2019 |
| CN | 210512458 | | 5/2020 |
| CN | 210862056 | | 6/2020 |
| CN | 113739533 | | 12/2021 |
| CN | 113739533 | A  * | 12/2021 |
| JP | H09310979 | | 12/1997 |
| JP | 2002255562 | | 9/2002 |
| JP | 2006-274201 | | 10/2006 |
| JP | 2012121584 | | 6/2012 |
| JP | 2017-131836 | | 8/2017 |
| KR | 10-2018-0074430 | | 7/2018 |
| KR | 10-2020-0107727 | | 9/2020 |

* cited by examiner

[FIG.1]
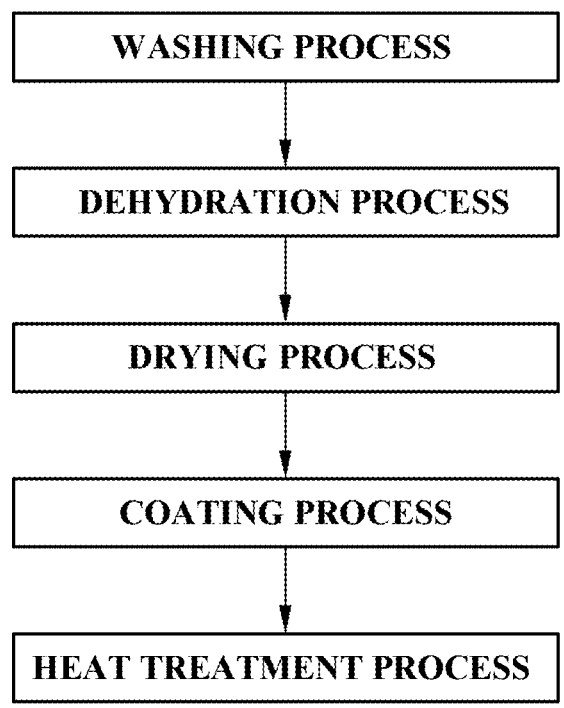

[FIG.2]
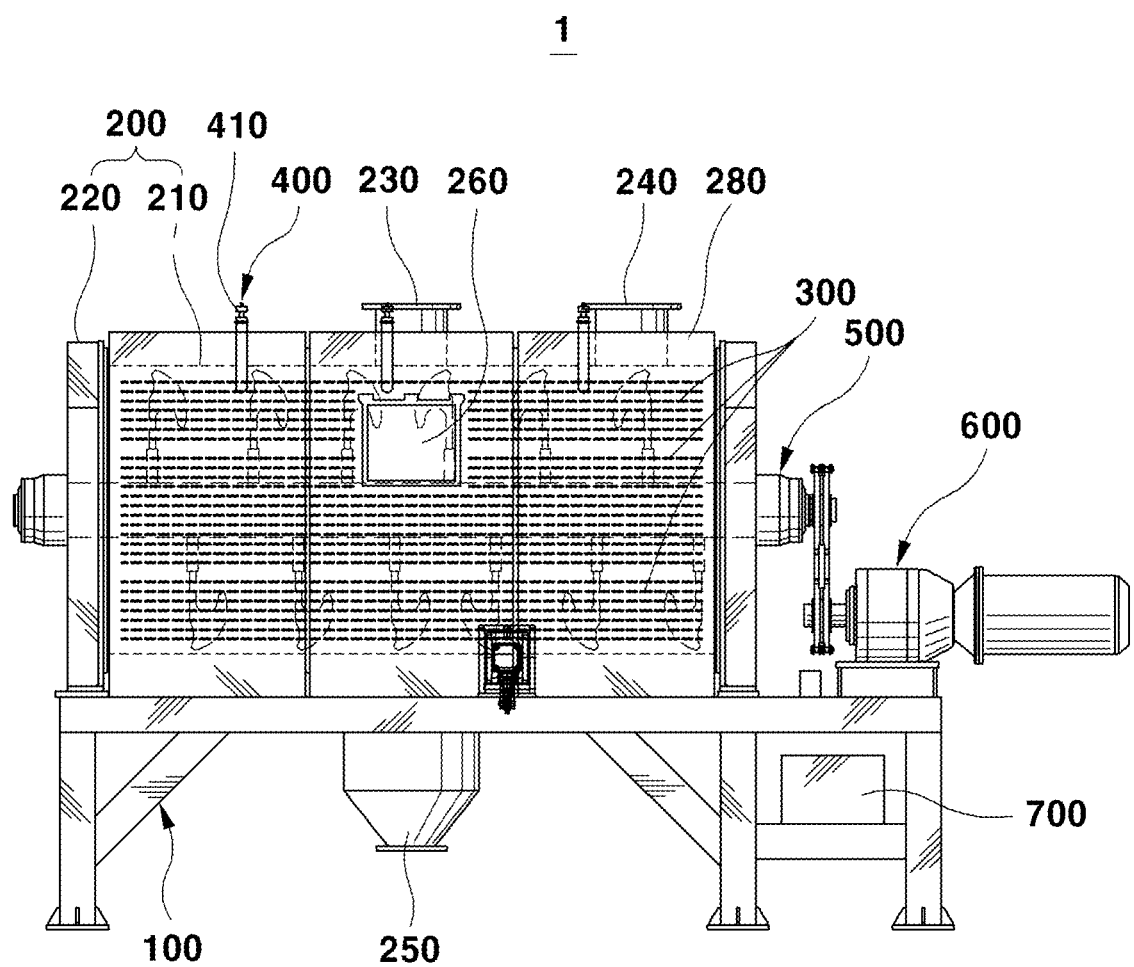

[FIG.3]
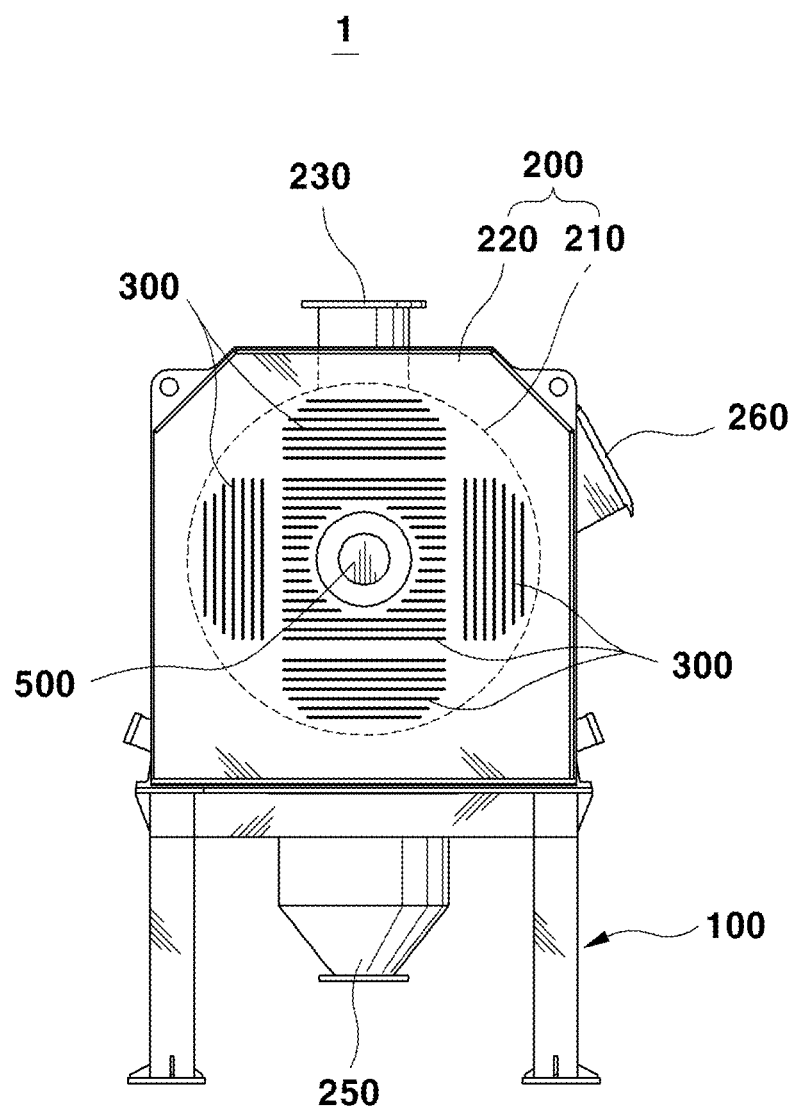

[FIG.4]
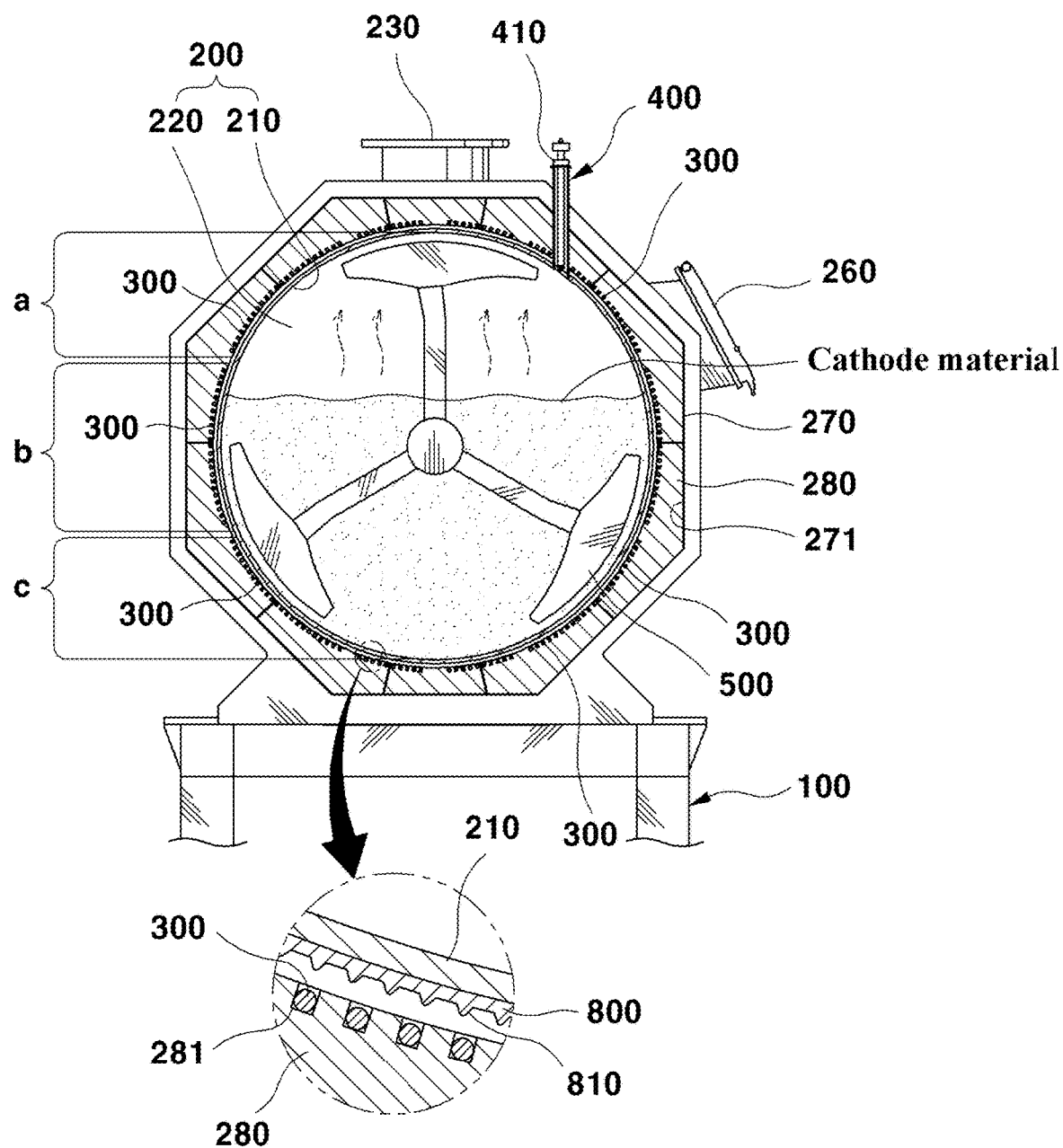

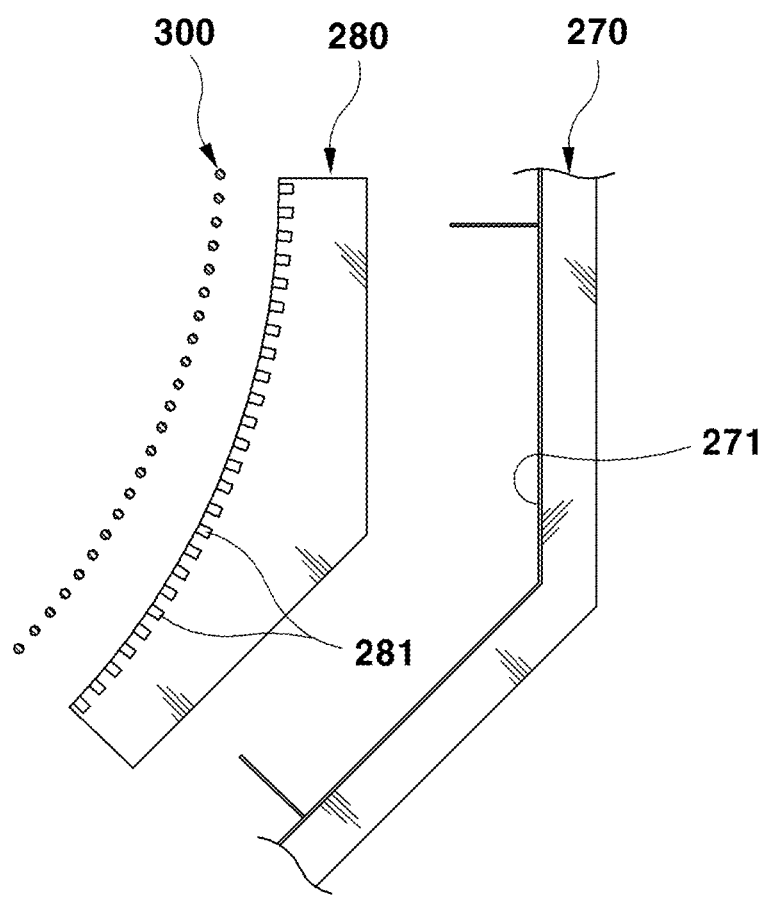
[FIG.5]

[FIG.6]
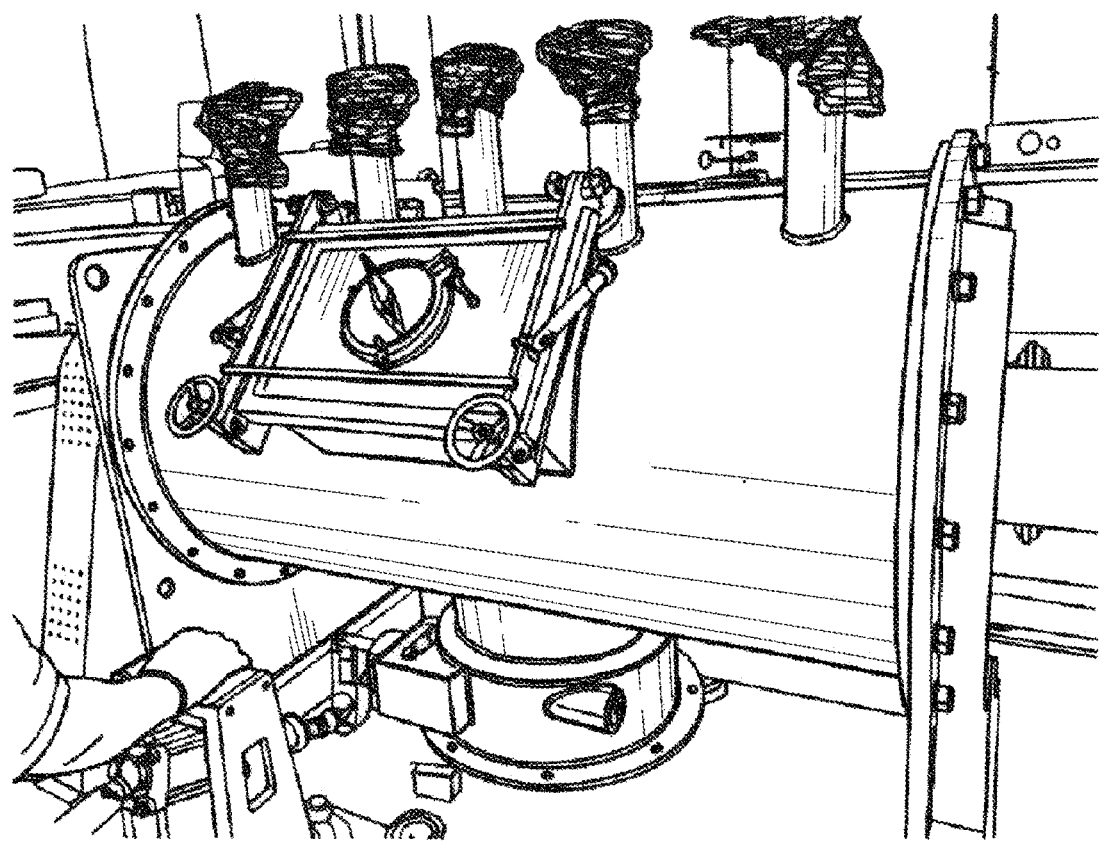

CATHODE MATERIAL INTEGRATED PROCESSING DEVICE

CROSS-REFERENCE TO RELATED APPLICATION

This application claims priority to and the benefit of Korean Patent Application No. 10-2022-0027858 filed at the Korean Intellectual Property Office on Mar. 4, 2022, the entire contents of which are incorporated herein by reference.

STATEMENT REGARDING GOVERNMENT SUPPORT

This research was supported by Development of Materials Components Technologies through Korea Evaluation Institute of Industrial Technology funded by Ministry of Trade, Industry and Energy. (Project No.: 20016080, Project name: Development of cathode material surface treatment technology and equipment with long-term stability at high temperature)

BACKGROUND OF THE INVENTION

1. Field of the Invention

The present invention relates to a cathode material integrated processing device, and more particularly, to a cathode material integrated processing device, in which processes of drying, applying, heat-treating a cathode material of a secondary battery are unified to maximize work efficiency, quality, and productivity according to manufacturing of the cathode material.

2. Description of the Related Art

In recent years, as mobile devices such as portable game consoles, portable phones (smart phones, etc.), and portable computers (laptop computers, tablet PCs, etc.) are widely distributed and used, demands for secondary batteries that are chargeable and dischargeable as power sources for mobile devices are rapidly increasing.

In addition, in order to be commercially applicable to electric vehicles (EVs), energy storage systems (ESSs), etc., research and development for improving performance and manufacturability of secondary batteries are being actively conducted.

In general, a secondary battery includes a cathode material, an anode material, an electrolyte, and a separator.

Among them, the cathode material is an important factor for determining performance (capacity, output, etc.) of the secondary battery.

Representative examples of the cathode material of the secondary battery include $LiCoO_2$ (LCO), $LiNiCoMnO_2$ (NCM), $LiNiCoAlO_2$ (NCA), $LiFePO_4$ (LFP), and the like.

As illustrated in FIG. 1, the cathode materials have to be subjected to each of washing, dehydration, drying, coating, heat treatment, and cooling processes to prevent quality of the cathode material from being deteriorated and improve intrinsic characteristics of the cathode material.

In addition, in the process of manufacturing the cathode material, a conventional cathode material drying device used in the drying process is disclosed in detail in Korean Patent Registration No. 10-1777977.

The conventional cathode material drying device is constituted by a drying furnace, a stirring device that stirs raw metal powder in the drying furnace, a heating/cooling chamber that is disposed around drying furnace to heat or cool the drying furnace while being isolated from the drying furnace, a steam device that supplies steam or cold air to the heating/cooling chamber, and a bag filter provided at the other side of a cooling device drying furnace to drop down the raw metal powder again into the drying furnace while discharging air and moisture, and thus, the cathode material is dried by heating the drying furnace through the steam supplied from the steam device to a pipe.

However, in the conventional cathode material drying device, since the steam or heat transfer oil is heated and transferred to the drying furnace through the pipe, a heat loss is high, and a temperature control is not easy.

In addition, since the conventional cathode material drying device only dries the cathode material and does not perform the coating and heat treatment processes. As a result, a separate coating and heat treatment device are required to complete the cathode material.

That is, in the conventional cathode material drying device, when adding a heat treatment function, it is not easy to heat the steam or heat transfer oil to a high-temperature heat capable of the heat treatment, and a severe partial temperature deviation occurs in the drying furnace, and thus, it is inappropriate to add the heat treatment function.

In addition, in the conventional cathode material drying device, since the cathode material has to be transferred to the coating and heat treatment devices after drying the cathode material, it takes a lot of time during the transfer process, and impurities may be mixed in the cathode material.

In addition, since the conventional cathode material drying device has a complicated structure due to the installation of pipes and a boiler, the structure is complex, and there are many difficulties in maintenance. The heat transfer oil used in the conventional cathode material drying device has a risk of explosion due to oil vapor and acts as a factor that causes environmental pollution.

Considering the above limitations, in the manufacturing of the cathode material according to the related art, it is difficult to improve work efficiency and quality and increase in productivity and safety.

Prior Art Document

Patent Document (Patent Document 1) Korean Patent Registration No. 10-1777977

SUMMARY OF THE INVENTION

The invention is intended to provide a cathode material integrated processing device, which is capable of providing high-temperature heat, has no temperature deviation and heat loss, and is capable of easily controlling a temperature to not only dry a cathode material and but also perform coating and heat treatment, thereby improving work efficiency, quality, and productivity according to manufacturing of the cathode material.

The invention is also intended to provide a cathode material integrated processing device in which an explosive element is removed in advance to improve safety. The invention is also intended to provide an eco-friendly cathode material integrated processing device which is capable of drying and heat-treating a cathode material without using heat transfer oil that causes environmental pollution.

According to an embodiment of the invention, there is provided a cathode material integrated processing device including: a support frame; a chamber part including a cylindrical body configured to accommodate the cathode material and a thick plate coupled to each of both ends of the cylindrical body to seal both the ends of the cylindrical body and configured to fix the cylindrical body to an upper portion of the support frame; a heating part disposed in each of the outside the cylindrical body and the outside the thick plate of the chamber part to heat the chamber part; a spray part including one or more nozzles, which is disposed between an upper portion and one side of the cylindrical body of the chamber part and is inserted in the cylindrical body to spray a coating liquid to the cathode material within the chamber part through a gas; a stirring part rotatably disposed inside the cylindrical body of the chamber part to stir the cathode material within the chamber part; a driving part connected to one side of the stirring part and rotatably disposed at one side of an upper portion of the support frame to rotate the stirring part; and a control part configured to control the heating part, the spray part, and the driving part.

According to one aspect, the chamber part may further includes: an input part disposed on an upper portion of one side of the cylindrical body to input the cathode material into the chamber part; an exhaust part disposed on an upper portion of the other side of the cylindrical body to discharge moisture within the chamber part to the outside; a discharge part disposed on a lower portion of the cylindrical body to discharge the cathode material to the outside of the chamber part; and a manhole part disposed at one side of the cylindrical body to be accessible for maintenance and cleaning inside the chamber part.

According to one aspect, the chamber part may further include: a housing provided to surround the outside of the cylindrical body to cover the cylindrical body; and a refractory block disposed to be spaced apart from the outside of the cylindrical body inside the housing to prevent heat inside the chamber part from being dissipated.

According to one aspect, the chamber part may further include an endothermic coating part that is applied to an outer surface of the cylindrical body to improve heat absorption of the chamber part.

According to one aspect, the endothermic coating part may further include an uneven part configured to enlarge a surface area of the endothermic coating part.

According to one aspect, the endothermic coating part may have a rough surface to expand the surface area, and an arithmetic mean roughness (Ra) value of the rough surface may range of about 7 μm to about 15 μm.

According to one aspect, the endothermic coating part may be prepared by applying a ceramic coating liquid containing $SiO_2$, $Al_2O_3$ and a black pigment.

According to one aspect, the heating part may be divided for blocks outside the cylindrical body and outside the thick plate so that each block is controlled by the control part.

According to one aspect, the housing may further include a partition wall protruding inward to partition the heating part, which is configured to heat the cylindrical body, for blocks.

According to one aspect, the cathode material integrated processing device may further include an accommodation groove recessed inward to accommodate the heating part inside the refractory block.

According to one aspect, the heating part may include an electric heating wire.

According to one aspect, the heating part may be spaced apart from the outside of the cylindrical body.

According to one aspect, the spaced distance may be about 15 mm or less.

BRIEF DESCRIPTION OF THE DRAWINGS

FIG. 1 is a view illustrating a process of manufacturing a cathode martial according to a related art.

FIG. 2 is a front view illustrating of a cathode material integrated processing device according to an embodiment of the invention.

FIG. 3 is a side view illustrating the cathode material integrated processing device according to an embodiment of the invention.

FIG. 4 is a side cross-sectional view illustrating the cathode material integrated processing device according to an embodiment of the invention.

FIG. 5 is a side view illustrating a housing and a refractory block of the cathode material integrated processing device according to an embodiment of the invention.

FIG. 6 is a view illustrating the endothermic coating part provided by applying the ceramic coating liquid

DETAILED DESCRIPTION OF THE EXEMPLARY EMBODIMENTS

Hereinafter, embodiments of the cathode material integrated processing device according to the invention will be described in more detail based on the accompanying drawings.

Here, components having the same function in all the drawings below use the same reference numerals, and repetitive descriptions are omitted. Furthermore, the terms to be described later are defined in consideration of the functions in the invention, which are unique and commonly used. should be interpreted in meaning. In addition, in the following description of the invention, if it is determined that a detailed description of the related known function or configuration may unnecessarily obscure the subject substance of the invention, the detailed description thereof will be omitted. Furthermore, when it is described that one includes some elements, it should be understood that it may include only those elements, or it may include other elements as well as those elements if there is no specific limitation.

FIG. 1 is a view illustrating a process of manufacturing a cathode martial according to a related art.

FIG. 2 is a front view illustrating of a cathode material integrated processing device according to an embodiment of the invention, FIG. 3 is a side view illustrating the cathode material integrated processing device according to an embodiment of the invention, FIG. 4 is a side cross-sectional view illustrating the cathode material integrated processing device according to an embodiment of the invention, and FIG. 5 is a side view illustrating a housing and a refractory block of the cathode material integrated processing device according to an embodiment of the invention.

As illustrated in the drawings, a cathode material integrated processing apparatus 1 according to an embodiment of the invention includes a support frame 100, a chamber part 200, a heating part 300, a spray part 400, a stirring part 500, the driving part 600, and the control part 700.

The support frame 100 is provided to be disposed below the chamber part 200.

The chamber part 200 includes a cylindrical body 210 for accommodating a cathode material in an upper portion of the support frame 100 and a thick plate 220 coupled to each of both ends of the cylindrical body 210 to seal both the ends of the cylindrical body 210 and configured to fix the cylindrical body 210 to an upper portion of the support frame 100.

The heating part 300 is configured to heat the chamber part 200 outside the cylindrical body 210 and the thick plate 220 of the chamber part 200.

The heating part 300 is provided as an electric heating wire that is heated by electricity.

The heating part 300 is divided into blocks on the outside of the cylindrical body 210 and the outside of the thick plate 220 so that the control part 700 controls the heating part 300 that is divided for the block.

The heating part is provided to be spaced apart from the outside of the cylindrical body.

The spray part 400 includes one or more nozzles 410 disposed between the upper portion and one side of the cylindrical body 210 of the chamber part 200 and inserted in a longitudinal direction of the cylindrical body 210 to spray a coating liquid to the cathode material within the chamber part 200 through a gas.

Although the spray part 400 is not shown in the drawings, the nozzle 410 is connected to a coating liquid supply part for supplying a coating liquid and a gas supply part for supplying a gas.

The stirring part 500 is disposed inside the cylindrical body 210 of the chamber part 200 to rotate and stir the cathode material inside the chamber part 200.

The stirring part 500 includes a stirring rotation shaft inserted into the cylindrical body 210 and having one end and the other end, which are rotatably supported inside the thick plate 220, one or more connection rods having one end fixed to a circumference of the stirring rotation shaft to protruding radially, and a blade fixed to the other end of the connection rod to stir the cathode material.

The driving part 600 is connected to one side of the stirring part 500 and rotatably disposed at one side of the upper portion of the support frame 100 to rotate the stirring part 500.

The driving part 600 may include a motor fixed to the upper portion of the support frame 100, a reducer connected to the motor, a sprocket connected to the reducer, a sprocket fixed to one end of the stirring rotation shaft, and a chain connecting the sprocket.

The control part 700 is disposed on the support frame 100 to control the heating part 300, the spray part 400, and the driving part 600.

Although the control part 700 is installed on the support frame 100 as an embodiment, the control part 700 may be installed anywhere as long as the control part 700 controls the heating part 300, the spray part 400, and the driving part 600.

In addition, in the chamber part 200, an input part 230 for inputting the cathode material into the chamber part 200 is disposed on an upper portion of one side of the cylindrical body 210.

Although not shown in the drawings, the input part 230 is connected to a cathode material supply part that supplies the cleaned cathode material to the chamber part 200.

An exhaust part 240 for discharging moisture within the chamber part 200 to the outside is disposed on an upper portion of the other side of the cylindrical body 210.

Although not shown in the drawings, the exhaust part 240 is connected to a filter and a moisture emitter.

A discharge part 250 for discharging the cathode material to the outside of the chamber part 200 is disposed on a lower portion of the cylindrical body 210.

A manhole part 260 that is accessible for maintenance and cleaning is disposed at one side of the cylindrical body 210 inside the chamber part 200.

In addition, the chamber part includes a housing 270, which is provided to surround the outside of the cylindrical body 210 to cover the cylindrical body 210, and a refractory block 280, which is disposed to be spaced apart from the outside of the cylindrical body 210 inside the housing 270 to prevent heat inside the chamber part 20 from being dissipated.

An accommodation part 271 that is partitioned into a plurality of spaces to accommodate and support the refractory block 280 is disposed inside the housing 270.

An accommodation groove 281 recessed inward to accommodate the heating part 300 is defined inside the refractory block 280.

An endothermic coating part 800 that is applied on an outer surface of the cylindrical body 210 and an outer surface of the thick plate 220 to improve heat absorption and thermal conductivity of the chamber part 200 is disposed in the chamber part 200.

An uneven part 810 for enlarging a surface area of the endothermic coating part 800 is disposed on a surface of the endothermic coating part 800.

The endothermic coating part 800 may have a rough surface to enlarge the surface area. Thus, the roughness of the surface may be in the range of about 7 μm to about 15 μm based on arithmetic average roughness (Ra).

In addition, the heating part 300 is disposed to be spaced apart from the outside of the cylindrical body 210 of the chamber part 200, and the spaced distance may be about 15 mm or less.

An operation of the cathode material integrated processing device according to an embodiment of the invention, which is configured as described above, will be described.

As illustrated in FIGS. 2 to 4, when the cathode material within the chamber part 200 is stirred using the stirring part 500 while the cleaned cathode material is put into the chamber part 200 through an input part 230 and is heated so that the chamber 200 has an internal temperature of about 100° C. to about 180° C. through the heating part 300, the cathode material is dried.

In addition, when the drying of the cathode material is completed, while the stirring part 500 stirs the cathode material, the spray part 400 sprays the coating liquid to the cathode material through the nozzle 410, and heat treatment is performed to apply the cathode material.

The heat treatment is performed while the chamber part 200 is heated at a high-temperature heat so that the chamber has an internal temperature of about 300° C. to about 600° C.

Thereafter, when the applying of the cathode material is completed, the cathode material is cooled and then discharged through the discharge part 250 to the outside, thereby completing the manufacturing of the cathode material.

That is, as the heating part 300 is provided as the electric heating wire 310 to directly heat the chamber part 200, there is no temperature deviation and heat loss inside the chamber part 200, and high-temperature heat at which the heat treatment is capable of being performed may be provided inside the chamber part 200.

Although the spray part 400 is not shown in the drawings, the nozzle 410 may be connected to each of a coating liquid supply part and a gas supply part, and thus, the nozzle 410 may spray the coating liquid to the cathode material inside the chamber part 200 through a gas so that the cathode material is coated with the coating liquid.

The stirring part 500 stirs and homogenizes the cathode material inside the chamber part 200 through the driving part 600 to efficiently perform drying, coating, and heat treatment processes of the cathode material through the stirring part 500.

In addition, as illustrated in FIG. 4, the heating part 300 may be disposed to be spaced apart from the outside of the cylindrical body 210 of the chamber part 200 to prevent the heating part 300 from being damaged due to thermal expansion of the chamber part 200.

The spaced distance of the heating part 300 may be within a range in which a heat transfer rate of the heating part 300 is not greatly reduced and within a level considering the thermal expansion of the chamber part 200. Since the heat transfer by convection current is reduced, a maximum temperature inside the chamber part may be lowered.

Therefore, the spaced distance may be about 15 mm or less.

In addition, the housing 270 protects the chamber part 200 from an external impact, and the refractory block 280 serves to prevent heat of the chamber part 200 from being dissipated during the drying or heat treatment of the cathode material.

The accommodation part 271 provided inside the housing 270 divides and accommodates the refractory blocks 280. Thus, since the refractory blocks 280 are separated from each other, it is easy to replace or repair the electric heating wire, and the refractory blocks 280 may be partially replaced.

In addition, the endothermic coating part 800 improves the heat absorption and thermal conductivity of the chamber part 200. Thus, when the cathode material is dried or heat-treated, heat from the heating part 300 may be quickly transferred to the chamber part 200 to reduce a time taken to dry or heat-treat the cathode material.

The endothermic coating part 800 may be made of an endothermic raw material including ceramic (aluminum oxide ($Al_2O_3$), silicon oxide ($SiO_2$), zirconium oxide ($ZrO_2$), etc.) and a black pigment to improve the heat absorption. The black pigment may be not only black but also a similar black pigment having excellent heat absorption compared to other colors. Particularly, in an embodiment of the invention, it may be made by applying a ceramic coating liquid containing $Al_2O_3$ and $SiO_2$ as ceramic raw materials and further containing the black pigment. An example of the endothermic coating part 800 provided by applying the ceramic coating liquid is illustrated in FIG. 6.

The endothermic coating part 800 made by applying the ceramic coating liquid as described above may rise the maximum temperature inside the chamber part 200 and reduce the reaching time.

Table 1 below shows results of measuring a temperature of the outer surface of the chamber part and the inner surface of the chamber part according to a heater temperature according to the presence or absence of the endothermic coating part.

TABLE 1

|  | Endothermic coating part Absence | Endothermic coating part Presence |
| --- | --- | --- |
| Heater temperature | 350° C. | 350° C. |
| Outer surface of | 313° C. | 356° C. |

TABLE 1-continued

|  | Endothermic coating part Absence | Endothermic coating part Presence |
| --- | --- | --- |
| chamber Maximum temperature (reaching time) | (150 minutes) | (50 minutes) |
| Inner surface of chamber Maximum temperature (reaching time) | 279° C. (150 minutes) | 325° C. (80 minutes) |

As can be seen from Table 1, it is seen that the maximum temperature inside the chamber at the same heater temperature in the presence of the endothermic coating part is higher than that of the case in the absence of the endothermic coating part, and the time taken to reach the maximum temperature is also short.

Therefore, the temperature inside the chamber may be raised to a desired temperature even at a low heater output, and thus, energy efficiency may be improved in the process of applying and heat-treating the cathode material.

The uneven portion 810 on the surface of the endothermic coating part 800 enlarges the surface area of the endothermic coating part 800, and thus, the enlarged surface area of the endothermic coating part 800 absorbs heat from the heating part 300 with high efficiency to quickly rise the temperature of the chamber part 200, thereby minimizing a heat loss of the heating part 300.

In addition, even if the surface of the endothermic coating part 800 does not have the uneven part 810, the surface area may be widened through the rough surface, and thus, the heat absorption performance may be improved. The surface roughness for improving the heat absorption performance may be in the range of about 7 μm to about 15 μm as an arithmetic mean roughness (Ra) value. If the roughness is too low, it is not possible to increase in surface area, which is insufficient to improve the heat absorption performance, and if the roughness is too high, it is not preferable because there is a limitation in that a process time for forming the high roughness increases, or it is difficult to apply the endothermic coating liquid. Therefore, the appropriate surface roughness is in the range of about 7 μm to about 15 μm, more preferably in the range of about 8 μm to about 12 μm in terms of arithmetic mean roughness (Ra) value.

In addition, as the heating part 300 is divided for the blocks in the chamber part 200, and each block is controlled by the control part 700, the temperature inside the chamber part may be uniform as a whole.

That is, referring to FIGS. 2 and 3, it is seen that a plurality of heating parts 300 are divided for the blocks outside the cylindrical body 210 of the chamber and outside the thick plate 220.

The reason why the heating part 300 is divided for the blocks and controlled by the control part 700 is for preventing a temperature deviation that varies for each space inside the chamber part 200 when drying or heat-treating the cathode material. If there is the temperature deviation inside the chamber part 200, the cathode material may be defective when the cathode material is manufactured.

For example, as illustrated in FIG. 4, when a convection phenomenon in which heat moves toward an upper space (a) occurs inside the chamber part 200 during drying or heat treatment of the cathode material, different temperature deviations occur in the upper space (a), a middle space (b), and a lower space (c) inside the chamber part 200.

Therefore, if the heating part 300 disposed in each of the upper space (a), the middle space (b), and the lower space (c) is controlled through the control part 700 to have the same temperature, the inside of the chamber part 200 may have the uniform temperature uniform as a whole.

Therefore, when drying or heat-treating the cathode material, it is possible to prevent the temperature deviation inside the chamber part 200, thereby reducing defects of the cathode material caused by the temperature deviation and completing the high-quality cathode material.

Due to the above-described configuration, the cathode material integrated processing device according to the invention may perform the drying, coating, and heat treatment processes through one device to improve the work efficiency, the quality, and the productivity according to the manufacturing of the cathode material.

That is, as the heating part is provided as the electric heating wire to provide the high-temperature heat to the inside of the chamber part, the present invention may effectively perform not only the drying process of the cathode material, but also the heat treatment process of the cathode material, and as the spray part sprays the coating liquid onto the cathode material inside the chamber part through the gas, the present invention may effectively perform the coating process of the cathode material, and the present invention may homogenize the cathode material during the drying, the coating, and the heat treatment of the cathode material through the stirring part.

In addition, since the conventional heat transfer oil is replaced with the electric heating wire in the heating part, the explosion accident due to the oil vapor may be prevented in advance, and the environmental pollution may not occur.

In addition, as the endothermic coating part is applied on each of the outer surface of the cylindrical body and the outer surface of the thick plate of the chamber to more improve the heat absorption and thermal conductivity of the chamber part, when drying or heat treating the cathode material, the chamber part may be quickly heated, and the heat loss may be maximally reduced.

In addition, as the heating part is divided into blocks on the outside of the cylindrical body and the outside of the thick plate so that the controller controls each block, the temperature deviation inside the chamber may be prevented from occurring, and the temperature inside the chamber may be uniform as a whole.

In addition, since the structure is simple, the installation and disassembly may be easy, and the time and cost associated with the maintenance may be saved.

What is claimed is:

1. A cathode material integrated processing device, which dries, applies, and heat-treats a cathode material, the cathode material integrated processing device comprising:
   a support frame;
   a chamber part comprising a cylindrical body configured to accommodate the cathode material and a plate coupled to each of both ends of the cylindrical body to seal both the ends of the cylindrical body and configured to fix the cylindrical body to an upper portion of the support frame;
   a heating part disposed in each of the outside of the cylindrical body and the outside of the plate of the chamber part to heat the chamber part;
   a spray part comprising one or more nozzles, which is disposed between an upper portion and one side of the cylindrical body of the chamber part and is inserted in the cylindrical body to spray a coating liquid to the cathode material within the chamber part through a gas;
   a stirring part rotatably disposed inside the cylindrical body of the chamber part to stir the cathode material within the chamber part;
   a driving part connected to one side of the stirring part and rotatably disposed at one side of an upper portion of the support frame to rotate the stirring part; and
   a control part configured to control the heating part, the spray part, and the driving part,
   wherein the chamber part comprises an endothermic coating part that is applied to an outer surface of the cylindrical body to improve heat absorption of the chamber part,
   wherein the endothermic coating part further comprises an uneven part configured to expand a surface area of the endothermic coating part on a surface thereof.

2. The cathode material integrated processing device according to claim 1, wherein the chamber part further comprises:
   an input part disposed on an upper portion of one side of the cylindrical body to input the cathode material into the chamber part;
   an exhaust part disposed on an upper portion of the other side of the cylindrical body to discharge moisture within the chamber part to the outside;
   a discharge part disposed on a lower portion of the cylindrical body to discharge the cathode material to the outside of the chamber part; and
   a manhole part disposed at one side of the cylindrical body to be accessible for maintenance and cleaning inside the chamber part.

3. The cathode material integrated processing device according to claim 1, wherein the chamber part further comprises:
   a housing provided to surround the outside of the cylindrical body to cover the cylindrical body; and
   a refractory block disposed to be spaced apart from the outside of the cylindrical body inside the housing to prevent heat inside the chamber part from being dissipated.

4. The cathode material integrated processing device according to claim 3, further comprising an accommodation part partitioned into a plurality of spaces to accommodate the refractory block inside the housing.

5. The cathode material integrated processing device according to claim 3, further comprising an accommodation groove recessed inward to accommodate the heating part inside the refractory block.

6. The cathode material integrated processing device according to claim 1, wherein the endothermic coating part has a rough surface to expand the surface area, and
   an arithmetic mean roughness (Ra) value of the rough surface ranges of about 7 μm to about 15 μm.

7. The cathode material integrated processing device according to claim 1, wherein the heating part is divided for blocks outside the cylindrical body and outside the plate so that each block is controlled by the control part.

8. The cathode material integrated processing device according to claim 1, wherein the heating part comprises an electric heating wire.

9. The cathode material integrated processing device according to claim 1, wherein the heating part is spaced apart from the outside of the cylindrical body.

10. The cathode material integrated processing device according to claim 9, wherein the spaced distance is about 15 mm or less.

11. The cathode material integrated processing device according to claim 1, wherein the endothermic coating part is prepared by applying a ceramic coating liquid containing $SiO_2$, $Al_2O_3$ and a black pigment.

* * * * *